July 1, 1930.  G. M. NELL  1,768,994
DRILL STEEL CENTRALIZER
Filed March 12, 1929
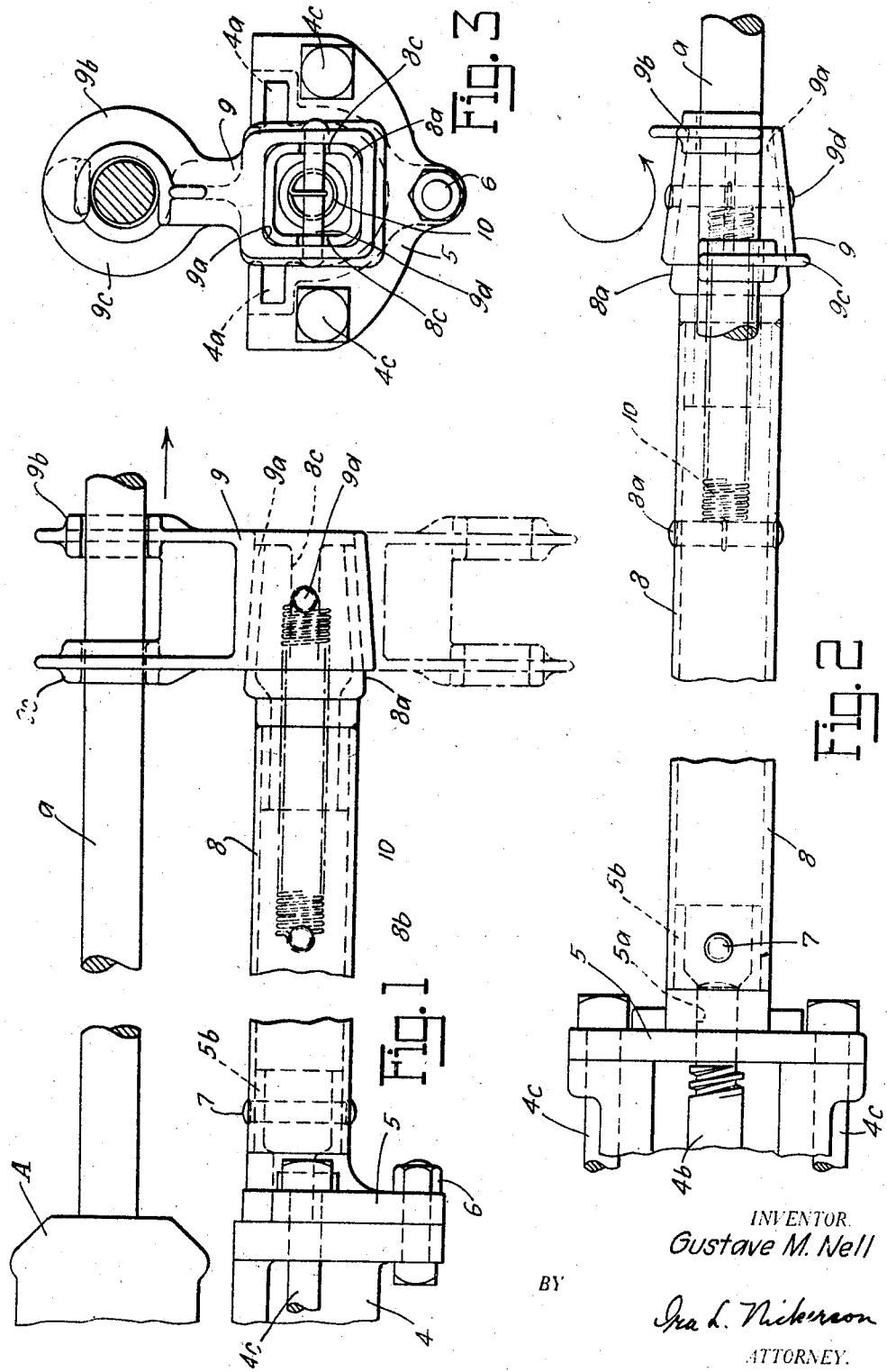
INVENTOR.
Gustave M. Nell
BY
Ira L. Nickerson
ATTORNEY.

Patented July 1, 1930

1,768,994

UNITED STATES PATENT OFFICE

GUSTAVE M. NELL, OF DETROIT, MICHIGAN, ASSIGNOR TO CHICAGO PNEUMATIC TOOL COMPANY, OF NEW YORK, N. Y., A CORPORATION OF NEW JERSEY

DRILL-STEEL CENTRALIZER

Application filed March 12, 1929. Serial No. 346,283.

This invention relates to rock drilling apparatus with particular reference to guiding devices for the drill steels, frequently referred to as centralizers.

One object of the invention is to provide improved means for supporting and guiding drill steels so as to "spot" holes accurately, to prevent "crawling", and to permit starting holes on an inclined or rough rock surface. Another object is to permit the guide or centralizer proper to be moved out of the way when no longer needed without the use of tools and without disconnecting it from the rest of the apparatus. Other objects will be apparent from the detailed description which follows.

In order to illustrate the invention one concrete embodiment thereof is shown in the accompanying drawings, in which:

Fig. 1 is a side elevational view of the forward end of a shell mounting with the centralizer apparatus attached thereto and indicating the manner of use of the same;

Fig. 2 is a top plan view of the apparatus shown in Fig. 1 with the drilling machine omitted but showing a broken away portion of the drill steel; and Fig. 3 is a right end elevational view of the apparatus shown in Figs. 1 and 2.

The invention takes the form of an attachment adapted to be applied to the conventional type of shell mounting 4 which has guide grooves $4^a$ (Fig. 3) to receive cooperating wing projections or flanges of a drilling machine such as A which is fed to and retracted from the work by the usual feed screw $4^b$ (Fig. 2). The attachment includes a base or face plate 5 secured to the forward end of shell 4 by the conventional side bolts $4^c$ and by one or more additional bolts 6, if necessary or desirable. Base or plate 5 may be, or may take the place of, the usual end plate and may provide a bearing $5^a$ (Fig. 2) for feed screw $4^b$ as indicated. Plate 5 has a reduced projecting portion $5^b$ in line with feed screw $4^b$ and with the axis of the shell mounting to which is secured in any suitable manner as by pin or rivet 7 a tubular or hollow extension 8 which has a tapered forward end $8^a$ of any desired shape in cross section; in the present instance it is shown as square.

Mounted upon the tapered forward end $8^a$ is a guide member 9 having a tapered socket $9^a$ conforming to the shape of extension end $8^a$. Member 9 has axially spaced guide arms $9^b$ and $9^c$ which are generally semicircular in shape as indicated in Fig. 3 and arranged to interengage opposite sides of the drill steel $a$ which is supported in drilling machine A. The space between the guide arms $9^b$ and $9^c$ permits the insertion and removal of the drill steel from the guide member by disposing these parts transverse to one another rather than in the parallel axial planes in which member 9 guides the steel as shown.

Resilient means are provided for retaining guide member 9 in place on extension end $8^a$ while permitting its removal therefrom for engagement or disengagement with drill steel $a$ or for replacement in a different position of angular adjustment. Such means may take the form of a coil spring 10 housed within the shell extension. Pins $8^b$ and $9^d$ may be provided in extension 8 and guide member 9 respectively for securing the ends of spring 10 thereto. With this construction, extension end $8^a$ is required to be slotted as indicated at $8^c$ to receive pin $9^d$ when member 9 is applied thereto and the number of slots, together with the configuration of the extention end $8^a$ determines the number of permissible positions of angular adjustment of guide member 9. In the present instance slots $8^c$, being in a horizontal plane only permit but two positions of member 9 on extension 8. The full line position shown in Fig. 1 is the operative one in which member 9 serves as a guide for drill steel $a$ while the reverse position, indicated in broken lines in the same figure, is the inoperative position.

The use of the apparatus will be quite clear from the previous description. With the parts in the position shown in all of the figures of the drawing, steel $a$ is guided by arms $9^b$ and $9^c$ for starting a hole. After the hole is started and the guiding of the forward portion of the drill is no longer necessary, the operator grasps member 9 and pulls it in the direction of the arrow (Fig. 1) against the tension of spring 10 off the end 8ᵃ of extension 8. He then twists member 9 counter clock-wise, as indicated by the arrow in Fig. 2, until member 9 is transverse to the axis of the extension, whereupon member 9 can be pulled downwardly off drill steel $a$. The operator then inverts member 9 and applies it to extension end 8ᵃ in the position shown in dotted outline in Fig. 1. To arrange member 9 to guide the drill steel, the above operations are reversed.

While the invention has been herein described in what is now considered to be a preferred form, it is to be understood that the invention is not limited to the specific details thereof but covers all changes, modifications and adaptations within the scope of the appended claims.

I claim as my invention:

1. The combination with a shell mounting for a drilling machine of a guide for the drill steel arranged to be supported on said mounting in a plurality of positions, and resilient means for holding said guide on said mounting in each of said positions.

2. A shell mounting for rock drills having an extension, a guide for the drill steel arranged to fit on the end of said extension in a plurality of positions of angular adjustment, and means maintaining a resilient connection between said guide and said mounting during changes of position.

3. A shell mounting for rock drills having an extension provided with a tapered end, a guide for the drill steel having a socket arranged to fit said tapered end in a plurality of positions of angular adjustment, and means preventing separation of said guide from said extension but permitting changes in the position of said guide thereon.

4. A shell mounting for rock drills having an extension, a guide for the drill steel movable axially on and off said support, and resilient means for holding said guide in place.

5. A shell mounting for drilling machines having a hollow extension, a drill steel guide movable axially on and off said support, and resilient means within said support for holding said guide in place.

6. A shell mounting for drilling machines having a hollow extension, a guide for the drill steel of the machine movable axially on and off said support, and a coil spring within said extension secured to said guide for holding the latter in place but permitting adjustment of its position upon said extension.

7. A shell mounting for drilling machines having an extension, a guide for the drill steel of the machine, cooperating means on said extension and on said guide providing for mounting the latter on the former in a plurality of positions of angular adjustment, and means continuously operable to hold said guide in place but permitting changes in the position of the latter.

8. A shell mounting for drilling machines having an extension provided with a tapered polygonal end, a guide member for the drill steel of the machine having a socket to fit the end of said extension, said member having spaced guide projections for engaging the opposite sides of the drill steel, and a flexible connection between said extension and said member for yieldingly holding the latter in place on the former but permitting its withdrawal therefrom, angular movement to free the same from the drill steel, and replacement in a different position of angular adjustment on said extension end.

Signed by me at Detroit, in the county of Wayne and State of Michigan, this 9th day of March, 1929.

GUSTAVE M. NELL.